United States Patent [19]
Fujii et al.

[11] Patent Number: 5,146,380
[45] Date of Patent: Sep. 8, 1992

[54] REEL LOCK MECHANISM FOR TAPE CASSETTE

[75] Inventors: Hiroshi Fujii; Keitaro Yamashita, both of Tokyo, Japan

[73] Assignee: Sony Corporation, Tokyo, Japan

[21] Appl. No.: 680,051

[22] Filed: Apr. 3, 1991

[30] Foreign Application Priority Data

Apr. 9, 1990 [JP] Japan .................................. 2-093694

[51] Int. Cl.[5] .......................................... G11B 23/087
[52] U.S. Cl. ................................................... 360/132
[58] Field of Search ........................ 360/132; 242/199

[56] References Cited

U.S. PATENT DOCUMENTS

| | | | |
|---|---|---|---|
| 4,553,717 | 11/1985 | Takagi | 360/132 |
| 4,679,110 | 7/1987 | Schoettle et al. | 360/132 |
| 4,712,149 | 12/1987 | Goto et al. | 360/132 |

Primary Examiner—Robert S. Tupper
Attorney, Agent, or Firm—Alvin Sinderbrand; William S. Frommer

[57] ABSTRACT

A reel lock mechanism for a tape cassette, including a lock portion having a pair of pawls adapted to engage a plurality of teeth formed at outer circumferences of a pair of tape reels for winding a tape, a slide portion slidably supported to a cassette case of the tape cassette, and a twistable connecting portion integrally connecting the lock portion with the slide portion. When one of the tape reels is moved in a slacking direction of the tape by vibration or the like applied to the tape cassette, the connecting portion is twisted by a moving force applied to one of the pawls to thereby rotate the lock portion. As a result, the other pawl is moved so as to rotate the other tape reel in a direction increasing a tension of the tape. Therefore, a locked condition of the other tape reel is prevented from being released, and the tape is always maintained under a proper tension, thus improving a reliability of reel locking.

5 Claims, 9 Drawing Sheets

REEL LOCK MECHANISM FOR TAPE CASSETTE

BACKGROUND OF THE INVENTION

The present invention relates to an improvement in a reel lock mechanism for a tape cassette.

In a tape cassette for use with a VTR or the like, there is provided a reel lock mechanism for preventing slack of a tape when the tape cassette is in an unused condition.

FIG. 7 shows an example of such a reel lock mechanism a in the conventional tape cassette.

Referring to FIG. 7, reference character b designates a lower half of a cassette case, and reference characters c and c' designate lower flanges of a supply tape reel and a take-up tape reel around which a magnetic tape d is wound. The lower flanges c and c' are formed with a plurality of outer circumferential teeth e and e', respectively.

Reference character f designates a reel lock member comprised of a main portion g and two lock portions h and h' projecting from the main portion g. The reel lock member f is biased in a direction as depicted by an arrow A by biasing means (not shown).

The lock portions h and h' are formed of an elastic material, and they are normally engaged with the teeth e and e' of the lower flanges c and c' to thereby lock the tape reels.

In other words, while the flanges c and c' are permitted to rotate in opposite directions of stretching the magnetic tape d as depicted by arrows B and B', the flanges c and c' are restrained from rotating in the directions of slacking the magnetic tape d by means of the lock portions h and h'.

However, in the conventional reel lock mechanism as mentioned above, when a force depicted by an arrow F in FIG. 8 due to vibration or the like is applied to the flange c of the supply reel, for example, the reel lock member f is moved in a direction depicted by an arrow C by this force F. As a result, the lock portion h' comes into disengagement from the tooth e' of the flange c' of the take-up reel.

Under the above condition, the take-up reel is allowed to rotate not only in the stretching direction of the tape d but also in the slacking direction of the tape d. Accordingly, the tape d is slackened to cause jamming (confused winding) of the tape, for example.

To cope with this problem, referring to FIG. 9, it is considered that click portions j and j' are formed at substantially middle positions of two lock portions i and i', respectively, so that when the force F is applied to the supply reel, the lock portion i is bent at the click portion j so as to escape the force F.

However, in the construction shown in FIG. 9, there is a problem regarding a strength of the click portions j and j'. That is, there is a possibility that the release of the locked condition cannot be reliably prevented dependently upon a magnitude of the force F to be applied.

SUMMARY OF THE INVENTION

It is an object of the present invention to provide a reel lock mechanism for a tape cassette which can reliably prevent slacking of a tape with a simple construction.

According to the present invention, there is provided a reel lock mechanism for a tape cassette including a cassette case, a pair of tape reels accommodated in said cassette case, each of said tape reels having a flange formed with a plurality of outer circumferential teeth, and a tape having opposite ends connected to said tape reels so as to be wound therearound, said reel lock mechanism for restraining rotation of said tape reels to prevent slacking of said tape, comprising a reel lock member adapted to slide between a lock position where the rotation of said tape reels is restrained and an unlock position where restraint of the rotation of said tape reels is released; said reel lock member comprising a slide portion slidably supported to said cassette case, a lock portion having a pair of pawls adapted to engage said outer circumferential teeth of said flanges of said tape reels, and a twistable connecting portion integrally connecting said slide portion with said lock portion.

With this construction, when one of said tape reels is moved in a slacking direction of said tape to thereby urge one of said pawls, said connecting portion is twisted to rotate said lock portion and thereby move the other pawl so that the other tape reel is rotated in a direction increasing a tension of said tape. Accordingly, even when one of the tape reels is moved by vibration or the like, a locked condition of the other tape reel is prevented from being released, and the tape is always maintained under a proper tension, thus preventing the jamming of the tape.

Other objects and features of the invention will be more fully understood from the following detailed description and appended claims when taken with the accompanying drawings.

DETAILED DESCRIPTION OF THE PREFERRED EMBODIMENTS

There will now be described a reel lock mechanism 1 according to a first preferred embodiment of the present invention with reference to FIGS. 1 to 5.

Figure 1:
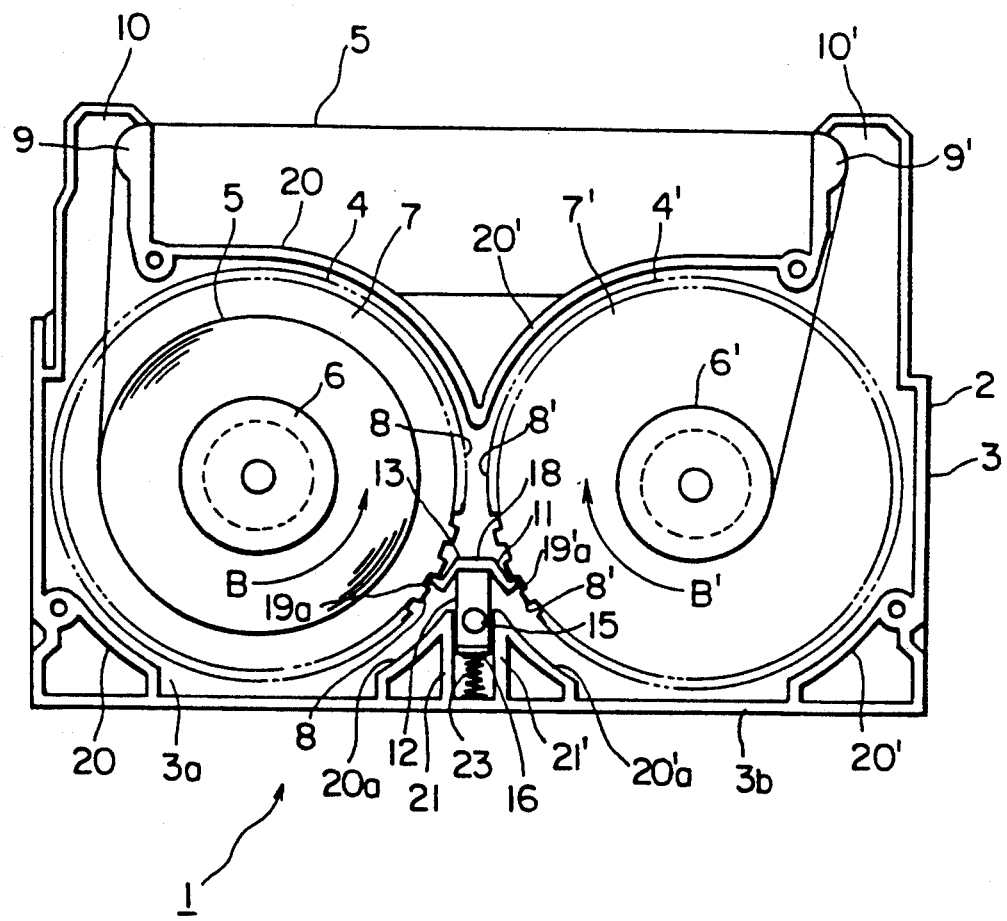
FIG. 1 is a schematic plan view of a tape cassette employing a reel lock mechanism according to a first preferred embodiment of the present invention, with an upper half of the tape cassette removed.

FIG. 1 shows a schematic illustration of an internal construction of a tape cassette 2.

Referring to FIG. 1, reference numeral 3 designates a cassette half (lower half) constituting a cassette case in cooperation with an upper half (not shown). A pair of tape reels 4 and 4' are rotatably accommodated in the cassette half 3. The tape reel 4 serves as a supply reel (which will be hereinafter referred to as "S reel"), and the tape reel 4' serves as a take-up reel (which will be hereinafter referred to as "T reel").

The tape reel 4 is constructed of a reel hub 6 around which a magnetic tape 5 is wound, and a pair of upper and lower reel flanges 7 (the lower flange 7 only being shown). Similarly, the tape reel 4' is constructed of a reel hub 6' around which the magnetic tape 5 is wound, and a pair of upper and lower flanges 7' (the lower flange 7' only being shown). The lower flanges 7 and 7' are formed with a plurality of outer circumferential teeth 8 and 8' arranged at regular intervals, respectively.

The magnetic tape 5 taken out from the S reel 4 is guided by a tape guide 9 to come out of an opening 10 of the tape cassette 2. Then, the magnetic tape 5 is introduced from another opening 10' into the tape cassette 2, and is taken up by the T reel 4' as being guided by another tape guide 9'.

Reference numeral 11 designates a reel lock member comprised of a slide portion 12, a lock portion 13, and a connecting portion 14 integrally connecting the slide portion 12 with the lock portion 13. The reel lock member 11 is formed of synthetic resin having a flexibility and an elasticity.

The slide portion 12 is formed as a rectangular plate-like portion elongated in the transverse direction of the tape cassette 2. The slide portion 12 is formed at its central position with a columnar projection 15 projection upwardly, and is further formed at its one longitudinal end, that is, at its rear end with a contact wall 16 projecting upwardly.

Figure 4A:
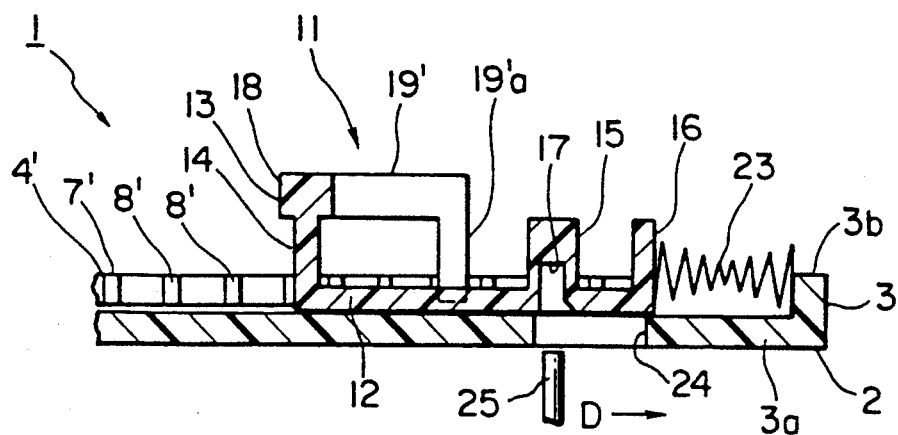
FIG. 4A is a cross section taken along the line IV-IV in FIG. 2, showing a condition before unlocking the reel lock member.
Figure 4B:
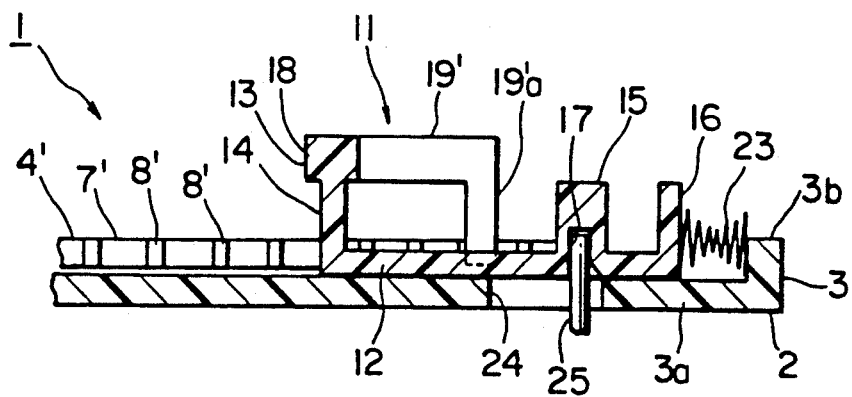
FIG. 4B is a view similar to FIG. 4A, showing a condition after unlocking the reel lock member.

As shown in FIGS. 4A and 4B, a lock release hole 17 is formed through the slide portion 12 into the columnar projection 15.

The connecting portion 14 is so formed as to project upwardly from the other longitudinal end of the slide portion 12, that is, from the front end thereof. The connecting portion 14 is formed as a thin plate-like portion which can be twisted.

The lock portion 13 is integrally formed with a central portion 18 and two lock arms 19 and 19' horizontally projecting from opposite ends of the central portion 18 so as to be inclined to the side of the contact wall 16.

The lock arms 19 and 19' are integrally formed at their outer ends with pawls 19a and 19'a adapted to engage the teeth 8 and 8' of the lower flanges 7 and 7', respectively. That is, the lock portion 13 has a substantially W-shaped configuration as viewed in plan as a whole.

The central portion 18 of the lock portion 13 is integrally connected to an upper end of the connecting portion 14.

Figure 2:
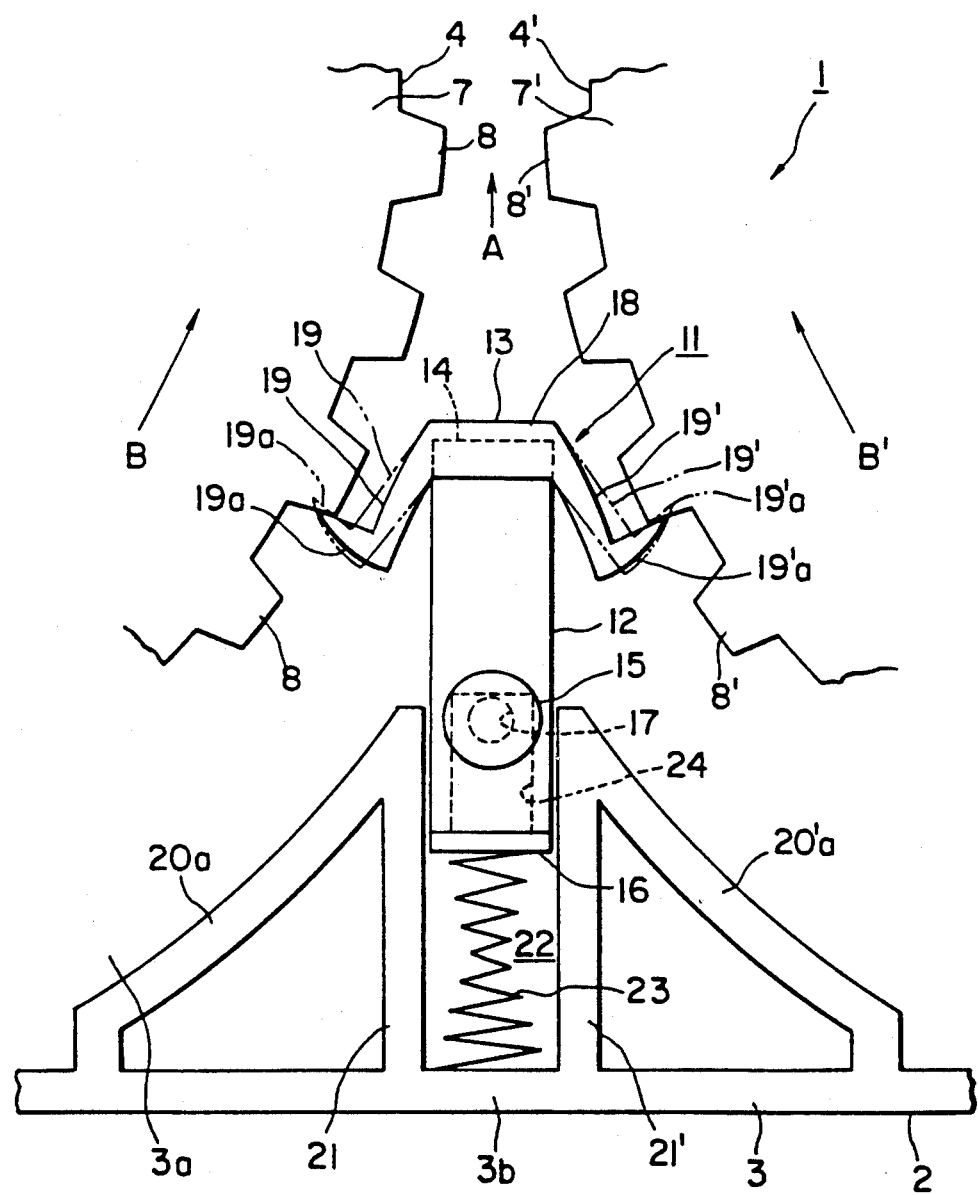
FIG. 2 is an enlarged plan view of the reel lock mechanism.
Figure 3:
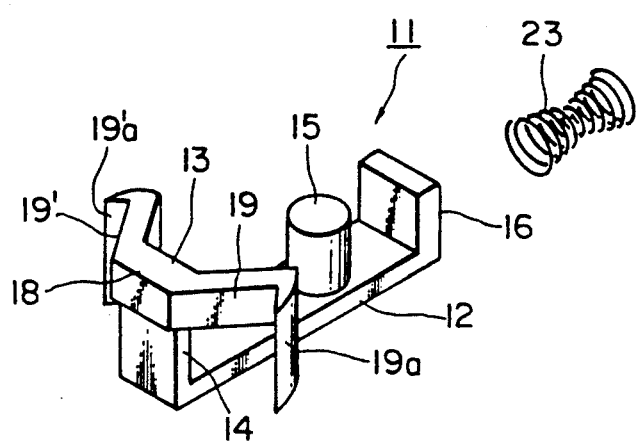
FIG. 3 is an enlarged exploded perspective view of the reel lock mechanism.
Figure 3:
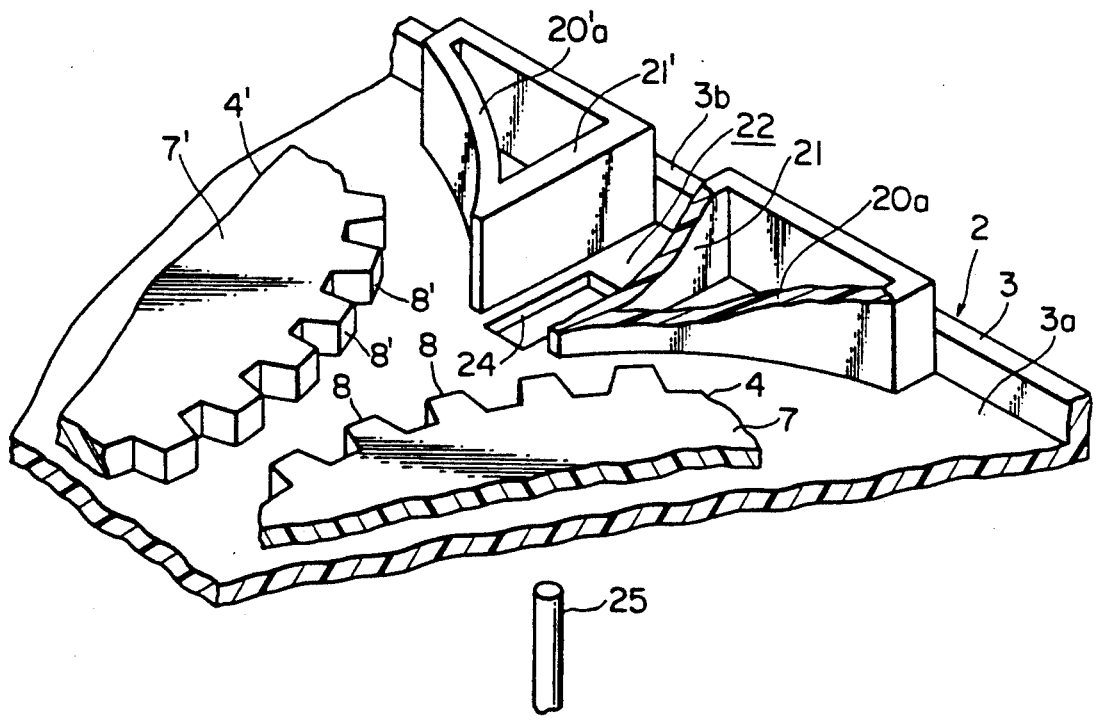

Referring to FIGS. 1 to 3, reference numerals 20 and 20' designate a plurality of ribs for defining spaces where the tape reels 4 and 4' are accommodated, respectively. The ribs 20 and 20' are formed to project upwardly from a bottom plate 3a of the lower half 3 so as to be located on circles having diameters slightly larger than those of the lower flanges 7 and 7', respectively.

A pair of arcuate standing walls 20a and 20'a each having an arcuate inside surface are also formed to project upwardly from the bottom plate 3a of the lower half 3 at a middle position of a rear wall 3b of the lower half 3 (assuming that a direction of taking out the magnetic tape 5 is defined as a front direction of the tape cassette 2). The standing walls 20a and 20'a form a part of the ribs 20 and 20', respectively. Further, a pair of straight standing walls 21 and 21' are also formed to project upwardly from the bottom plate 3a so as to extend in parallel from the rear wall 3b in the front direction of the tape cassette 2 and continue to the arcuate standing walls 20a and 20'a, respectively.

There is defined a space 22 by the parallel straight standing walls 21 and 21', the bottom plate 3a, and the rear wall 3b. The slide portion 12 of the reel lock member 11 is received in the space 22 so as to be slidable in the front and rear directions of the tape cassette 2.

Reference numeral 23 designates a coil spring having large-diameter opposite end portions and a small-diameter central portion.

One end of the coil spring 23 is in elastic contact with the contact wall 16 of the slide portion 12 of the reel lock member 11, and the other end of the coil spring 23 is in elastic contact with the inner surface of the rear wall 3b forming the space 22.

Accordingly, the reel lock member 11 is normally frontwardly biased by an elastic force of the coil spring 23 under the condition where the pawls 19a and 19'a of the lock portion 13 of the reel lock member 11 are engaged with the teeth 8 and 8' of the lower flanges 7 and 7' of the tape reels 4 and 4', respectively.

The bottom plate 3a of the lower half 3 defining the space 2 is formed with a lock release hole 24. When the tape cassette 2 is loaded into a VTR (not shown), a lock release pin 25 provided in the VTR is inserted through the lock release hole 24 of the tape cassette 2 into the engagement hole 17 of the slide portion 12 as shown in FIGS. 4A and 4B. Then, the lock release pin 26 is moved in a direction as depicted by an arrow D in FIG. 4A to move the reel lock member 11 rearwardly against the biasing force of the coil spring 23. As a result, the engagement of the pawls 19a and 19'a of the lock portion 13 with the teeth 8 and 8' of the lower flanges 7 and 7' is released as shown in FIG. 4B.

In operation, the slacking of the magnetic tape 5 is prevented by the reel lock member 11 in the following manner.

When the tape cassette 1 is in an unused condition, the reel lock member 11 is biased by the elastic force of the coil spring 23 in the front direction as depicted by an arrow A in FIG. 2. Accordingly, the lock arms 19 and 19' are flexed slightly rearwardly from a natural condition as shown by a phantom line in FIG. 2 (i.e., a condition before elastic deformation), and the pawls 19a and 19'a are maintained in engagement with the teeth 8 and 8' of the lower flanges 7 and 7', respectively (i.e., a condition as shown by a solid line in FIG. 2).

Accordingly, the lower flanges 7 and 7' normally receive torques in the directions as depicted by arrows B and B' in FIG. 2 due to restoring forces of the lock arms 19 and 19', respectively, that is, in the directions increasing a tension of the magnetic tape 5. Thus, the rotation of the flanges 7 and 7' in the directions counter to the arrows B and B' is inhibited.

It is considered that a moving force in a direction slacking the magnetic tape 5 due to vibration or the like of the tape cassette 2 is applied to one of the tape reels. For example, referring to FIG. 5, it is considered that the S reel is rotated in a direction as depicted by an arrow $\overline{B}$ counter to the arrow B, and a force in a direction as depicted by an arrow F is applied to the lock arm 19 by the torque of the S reel in the direction $\overline{B}$.

Figure 5:
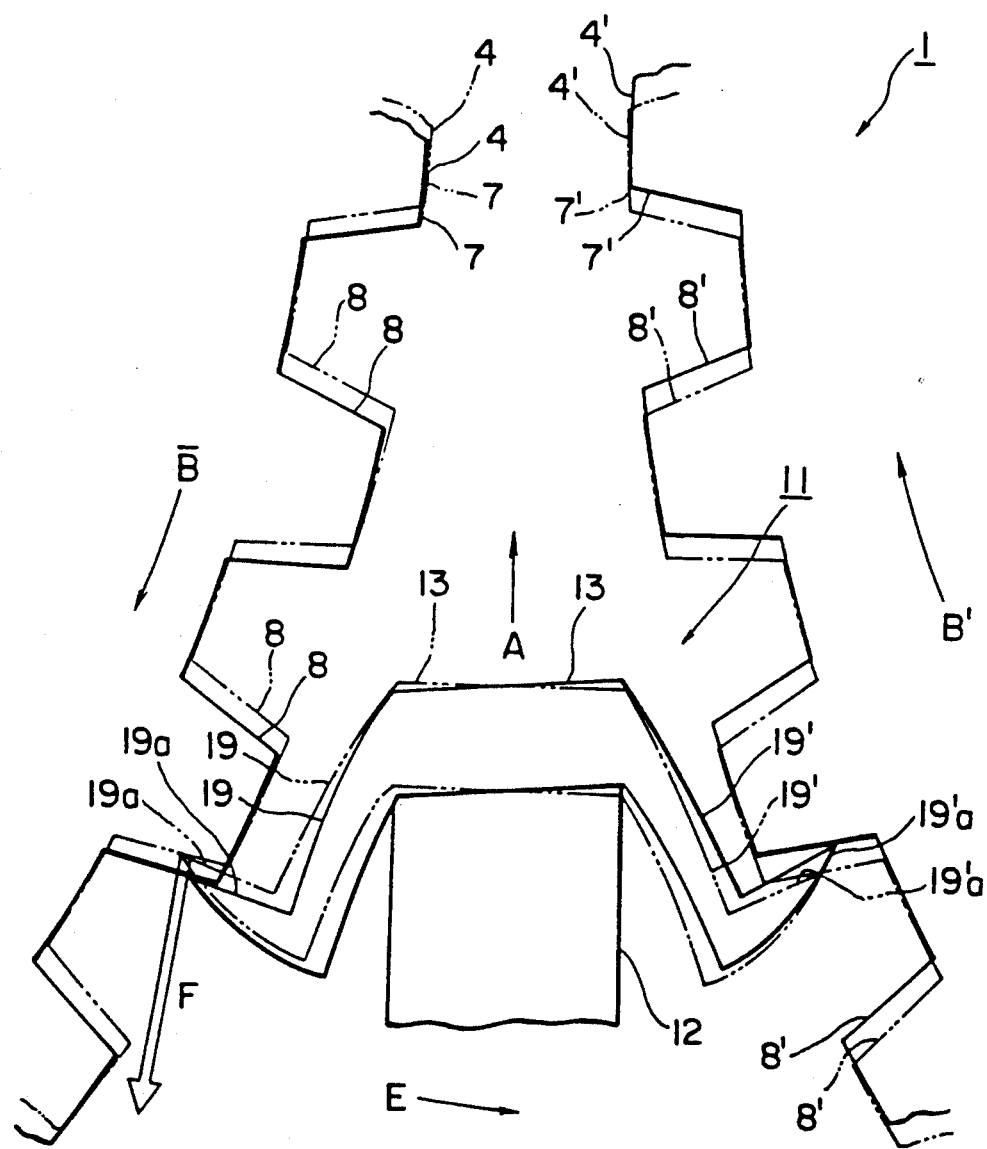
FIG. 5 is an enlarged plan view explaining the operation of the reel lock member.

In this case, the pawl 19a of the lock arm 19 is moved in a direction as depicted by an arrow E by the force F, and the lock portion 13 is rotated in a counterclockwise direction as viewed in FIG. 5 owing to twisting of the connecting portion 14.

In cooperation therewith, the other lock arm 19' receives a torque in the counterclockwise direction. As a result, the pawl 19'a of the lock arm 19' is urged against a side surface of the tooth 8' of the lower flange 7', and the lower flange 7' therefore receives a further torque in the direction B'.

Thus, a force in the direction increasing the tension of the magnetic tape 5 is applied to the magnetic tape 5, thereby preventing the slacking of the magnetic tape 5.

In the reel lock mechanism 1 as mentioned above, even when one of the reel flanges is moved by vibration or the like, the lock portion 13 is rotated about the center of the connecting portion 14 so as to avoid unlocking of the other reel flange. At this time, the lock portion 13 operates to always apply a torque in the stretching direction of the magnetic tape 5 to the other reel flange. Accordingly, the slacking of the magnetic tape 5 is prevented to avoid the jamming of the magnetic tape 5.

Further, since the lock portion 13 is integrally formed with the slide portion 12, reliable reel locking can be attained with a small number of parts.

There will now be described a reel lock mechanism 26 according to a second preferred embodiment of the present invention with reference to FIG. 6. In the second preferred embodiment, the construction of the reel lock mechanism 26 is substantially the same as that of the reel lock mechanism 1 in the first preferred embodiment with the exception that the form of the connecting portion 14 connecting the lock portion 13 to the slide portion 12 in the reel lock member 11 according to the first preferred embodiment is modified. Accordingly, the same parts as those in the first preferred embodiment are designated by the same reference numerals, and the explanation thereof will be omitted.

Figure 6:
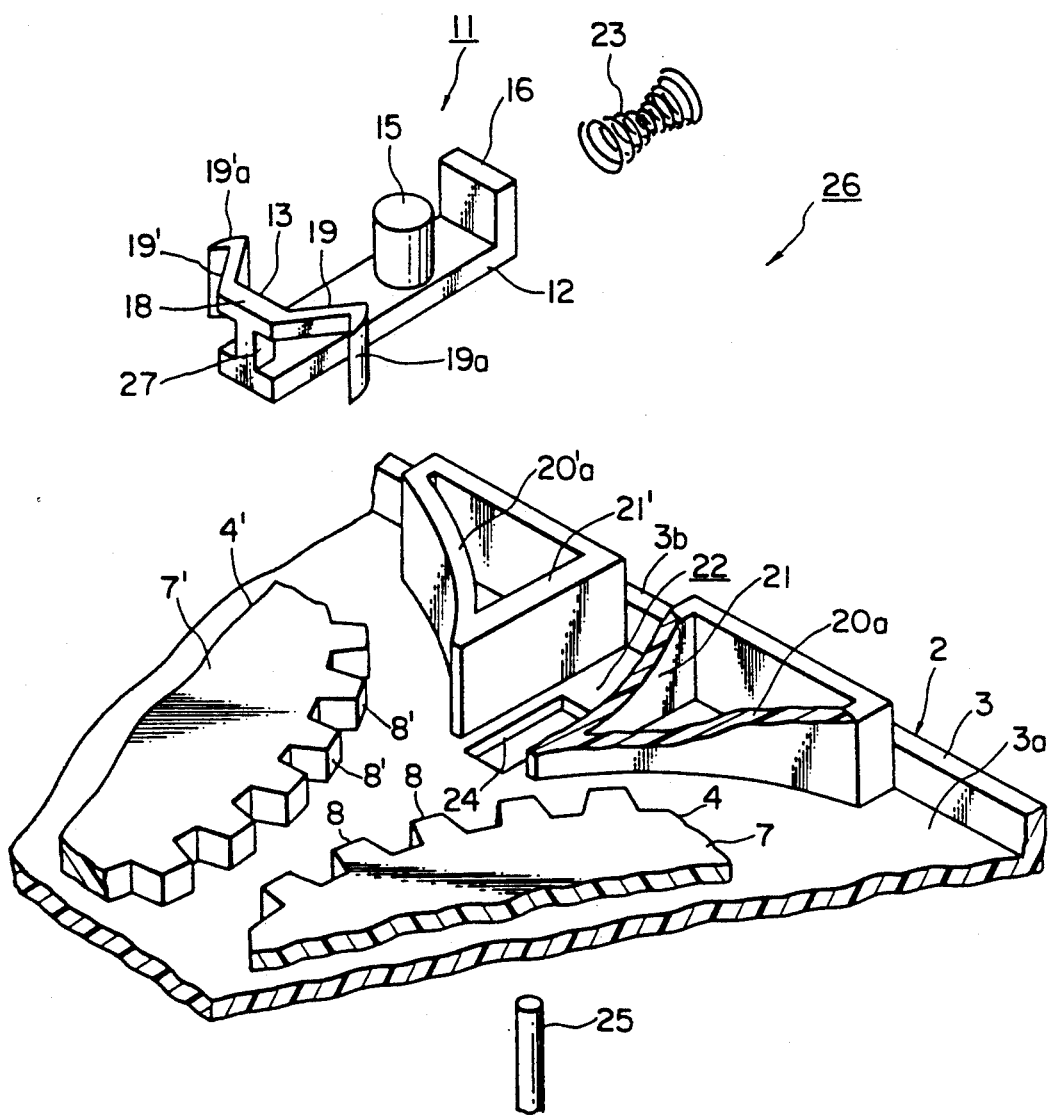
FIG. 6 is an enlarged exploded perspective view of the reel lock mechanism according to a second preferred embodiment of the present invention.
Figure 7:
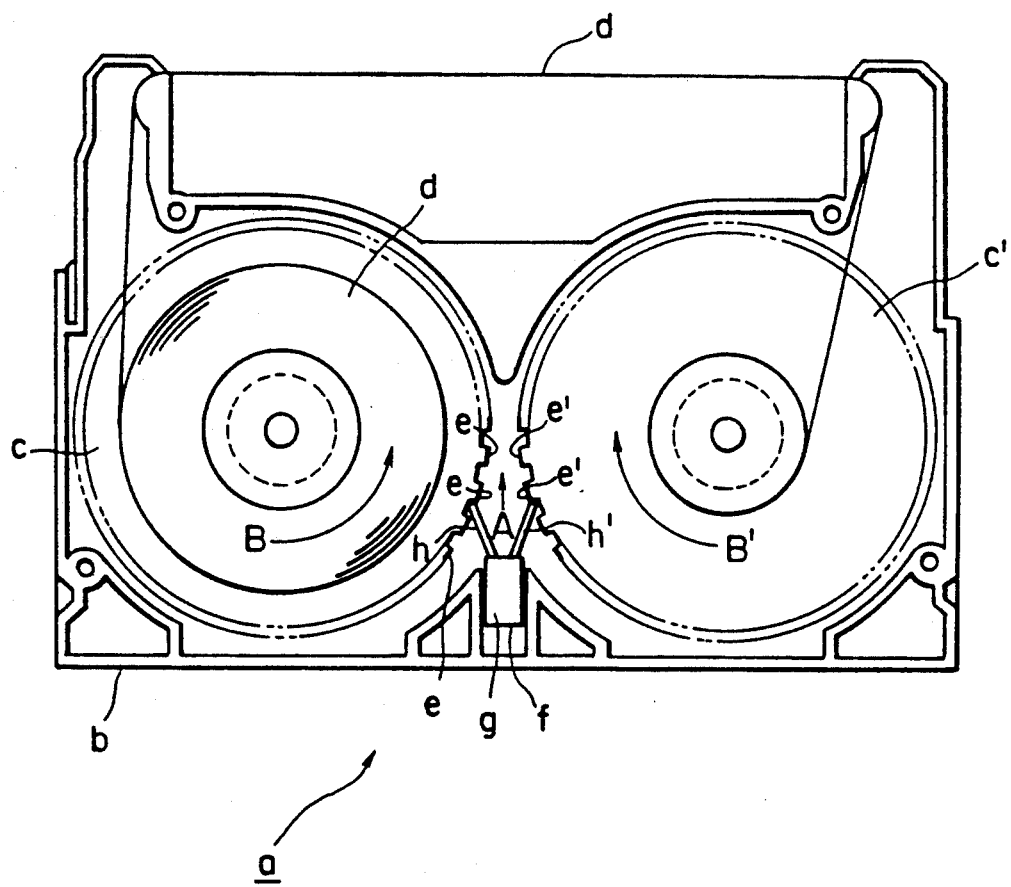
FIG. 7 is a schematic plan view of a tape cassette employing the conventional reel lock mechanism.
Figure 8:
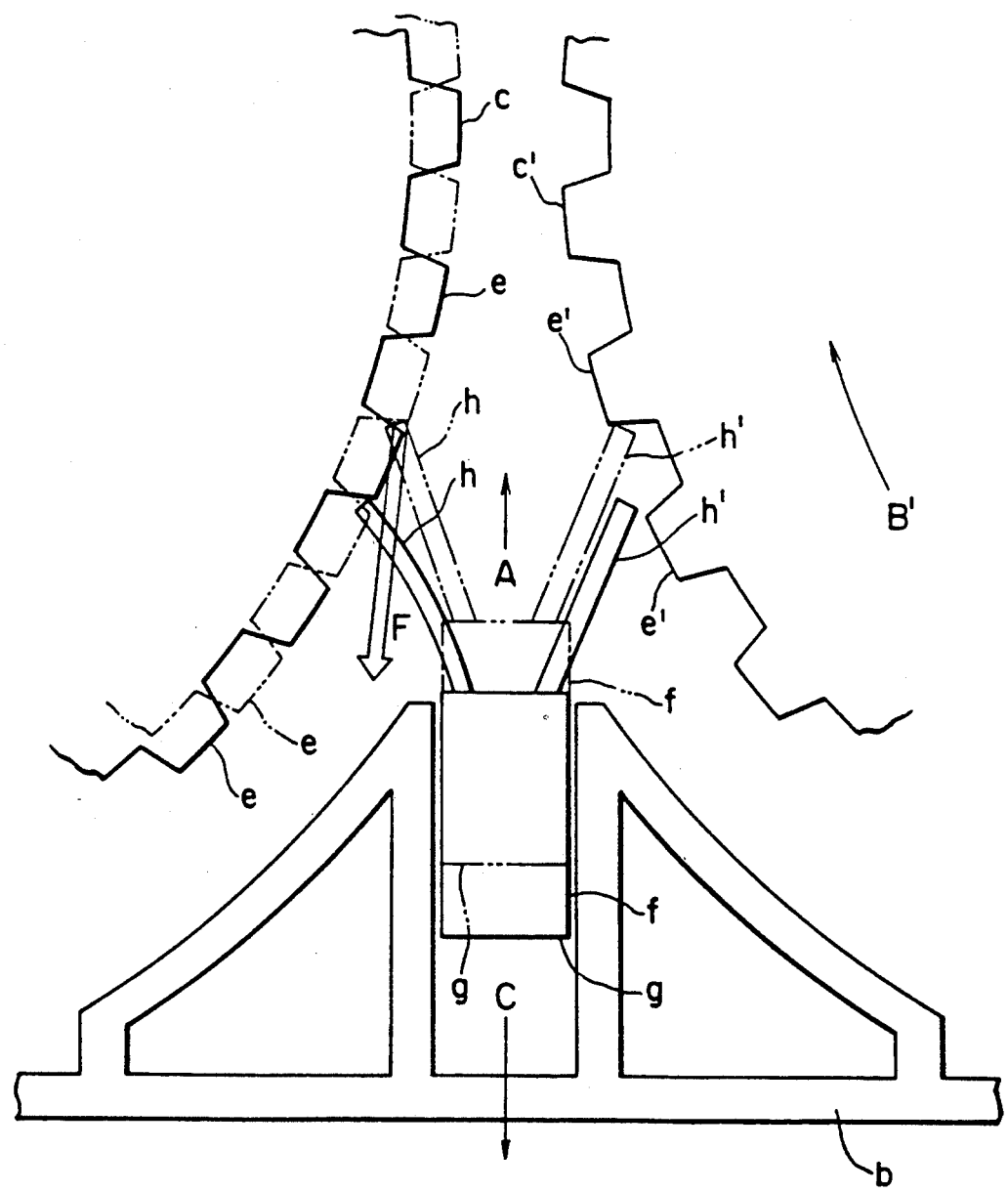
FIG. 8 is an enlarged plan view of the conventional reel lock mechanism, explaining the problem thereof.
Figure 9:
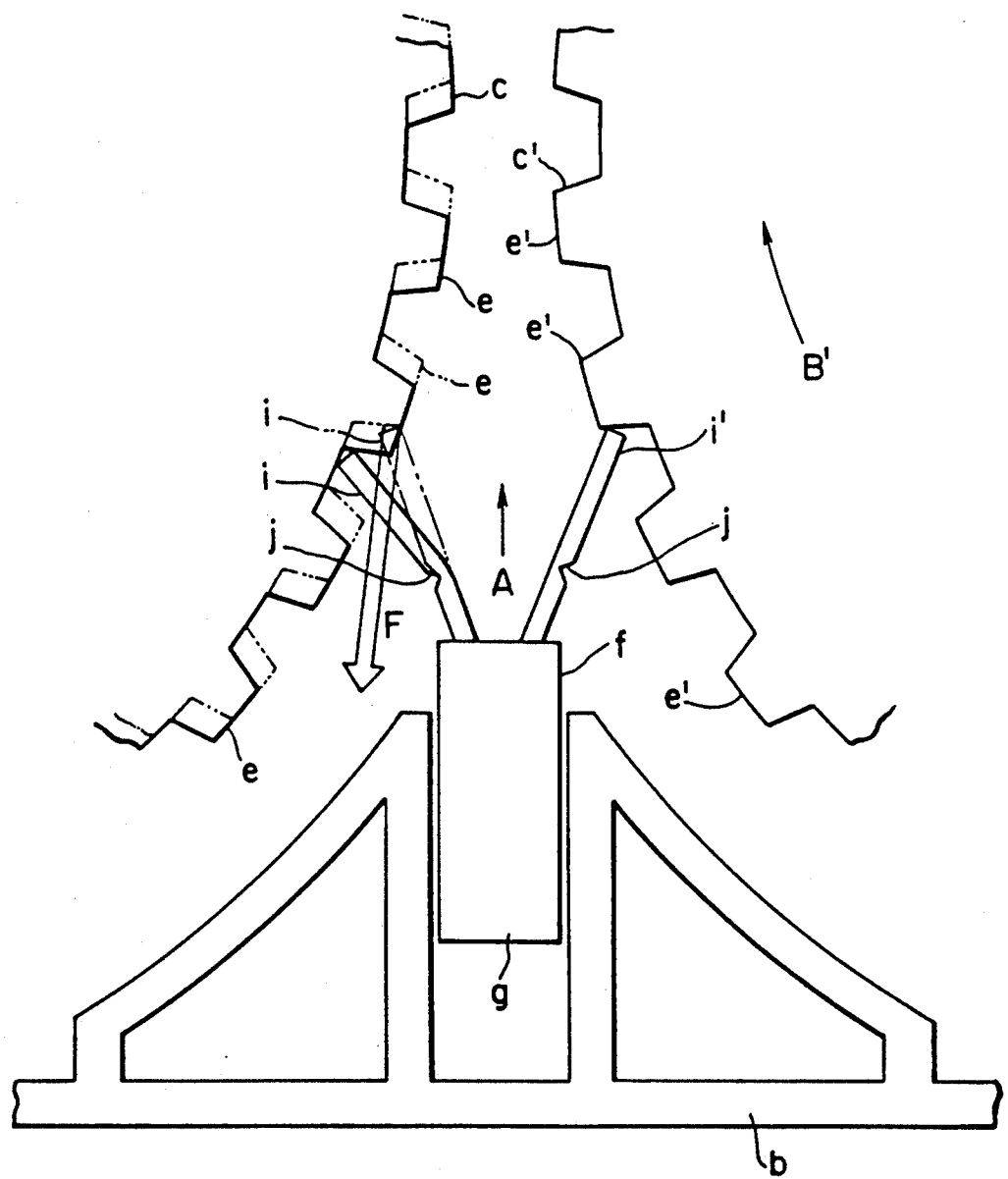
FIG. 9 is an enlarged plan view of an improved example of the conventional reel lock mechanism.

Referring to FIG. 6, the reel lock member 11 is integrally formed with the slide portion 12 and the lock portion 13 through a connecting portion 27, and it is formed of synthetic resin having a flexibility and an elasticity.

The connecting portion 27 is formed as a slender square bar portion which can be twisted, and the center portion 18 of the lock portion 13 is integrally connected to an upper end of the connecting portion 27.

As the connecting portion 27 is slender enough to be twisted, it permits rotation of the lock portion 13.

Although the method of releasing the locked condition of the reel flanges upon loading the tape cassette into a VTR in the above preferred embodiments is such that the lock release pin 25 is moved rearwardly after it is inserted into the hole 17 of the slide portion 12, such a lock releasing method is not limited to the above. For example, an inner surface of the hole 17 of the slide portion 12 against which surface the lock release pin 25 comes into abutment may be tapered so that the reel lock member can be automatically slid in the lock release direction by only inserting the lock release pin 25 into the hole 17.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A reel lock mechanism for a tape cassette including a cassette case, a pair of tape reels accommodated in said cassette case, each of said tape reels having a flange formed with a plurality of outer circumferential teeth, and a tape having opposite ends connected to said tape reels so as to be wound therearound;

said reel lock mechanism for restraining rotation of said tape reels to prevent slacking of said tape, comprising a reel lock member adapted to slide between a lock position where the rotation of said tape reels is restrained and an unlock position where restraint of the rotation of said tape reels is released;

said reel lock member comprising a slide portion slidably supported to said cassette case, a lock portion having a pair of pawls adapted to engage said outer circumferential teeth of said flanges of said tape reels, and a twistable connecting portion integrally connecting said slide portion with said lock portion;

wherein when one of said tape reels is moved in a slacking direction of said tape to thereby urge one of said pawls, said connecting portion is twisted to rotate said lock portion and thereby move the other pawl so that the other tape reel is rotated in a direction increasing a tension of said tape.

2. The reel lock mechanism as defined in claim 1, wherein said reel lock member is formed of synthetic resin having a flexibility and an elasticity.

3. The reel lock mechanism as defined in claim 1, wherein said lock portion has a substantially W-shaped configuration, and a central portion of said lock portion is integrally connected to an upper end of said connecting portion.

4. The reel lock mechanism as defined in claim 1, wherein said connecting portion is formed as a thin plate-like portion.

5. The reel lock mechanism as defined in claim 1, wherein said connecting portion is formed as a slender square bar portion.

* * * * *